No. 702,448. Patented June 17, 1902.
H. P. MAXIM & H. M. POPE.
MOTOR VEHICLE.
(Application filed June 12, 1897.)
(No Model.) 3 Sheets—Sheet 1.
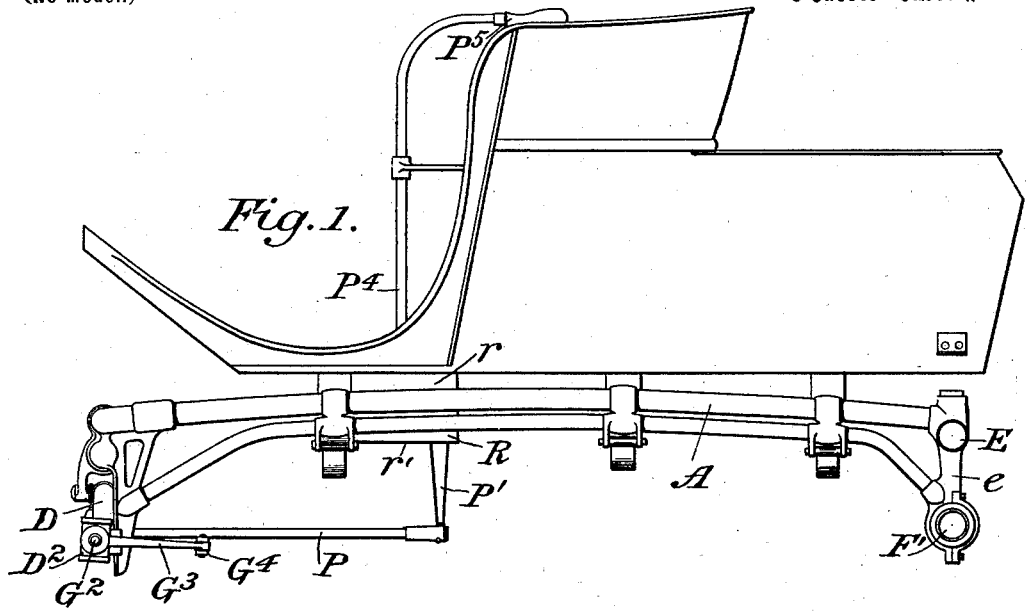
Attest:
A. N. Jesbera.
F. M. Eggleston.
Inventors:
Hiram Percy Maxim
and Harry M. Pope
by Redding, Kiddle & Greeley
Attys.

No. 702,448. Patented June 17, 1902.
H. P. MAXIM & H. M. POPE.
MOTOR VEHICLE.
(Application filed June 12, 1897.)
(No Model.) 3 Sheets—Sheet 2.
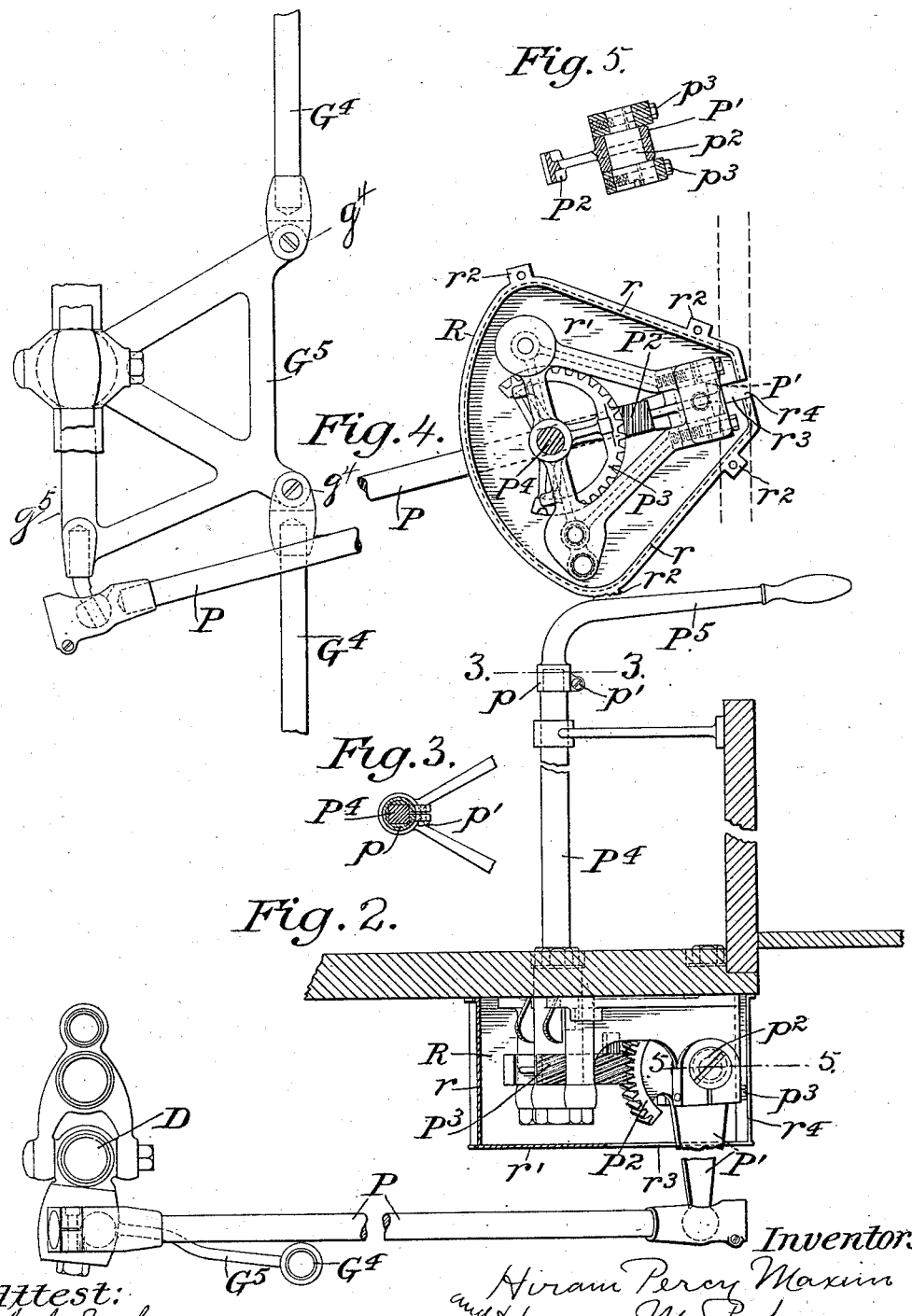

No. 702,448. Patented June 17, 1902.
H. P. MAXIM & H. M. POPE.
MOTOR VEHICLE.
(Application filed June 12, 1897.)
(No Model.) 3 Sheets—Sheet 3.
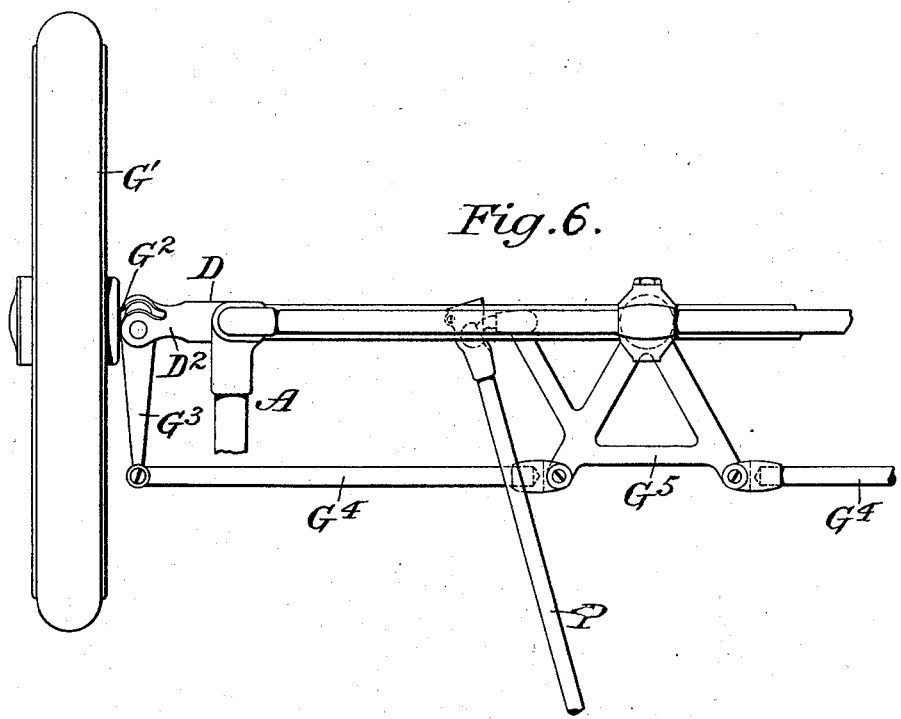
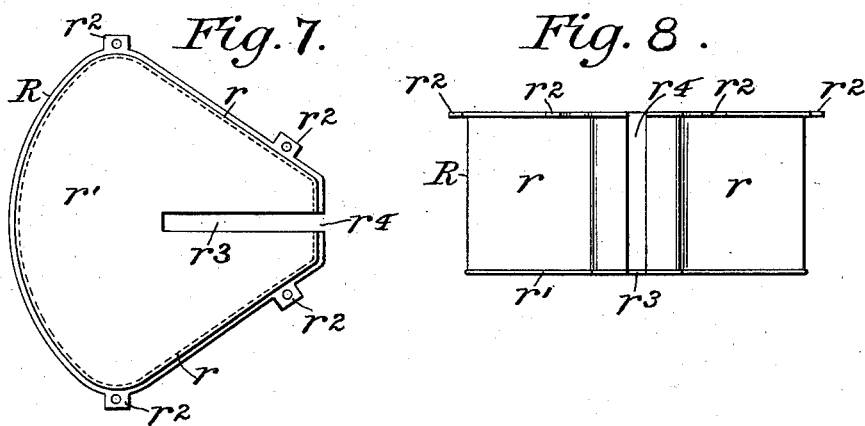
Attest:
A. N. Jesbera.
F. M. Eggleston.
Inventors:
Hiram Percy Maxim
and Harry M. Pope
by Redding, Kiddle & Greeley
Attys.

UNITED STATES PATENT OFFICE.

HIRAM PERCY MAXIM AND HARRY M. POPE, OF HARTFORD, CONNECTICUT, ASSIGNORS, BY MESNE ASSIGNMENTS, TO ELECTRIC VEHICLE COMPANY, OF NEW YORK, N. Y., AND JERSEY CITY, NEW JERSEY, A CORPORATION OF NEW JERSEY.

MOTOR-VEHICLE.

SPECIFICATION forming part of Letters Patent No. 702,448, dated June 17, 1902.

Application filed June 12, 1897. Serial No. 640,429. (No model.)

*To all whom it may concern:*

Be it known that we, HIRAM PERCY MAXIM and HARRY M. POPE, citizens of the United States, residing in the city and county of Hartford, State of Connecticut, have invented certain new and useful Improvements in Motor-Vehicles, of which the following is a specification, reference being had to the accompanying drawings, forming a part hereof.

This invention relates in general to motor-vehicles, and the special object in view has been to improve the construction of such vehicles, particularly with respect to the steering mechanism.

The invention is illustrated in a convenient and practical embodiment thereof in the accompanying drawings, in which—

Figure 1 is a side elevation of a motor-vehicle with the wheels and motor removed. Fig. 2 is a detail view of the steering mechanism in side elevation, partly broken out to save space and with a portion of the carriage-body platform in section. Fig. 3 is a detail plan view in section on the line 3 3 of Fig. 2. Fig. 4 is a detail plan view of the steering mechanism, partly broken out to save space. Fig. 5 is a detail view in section on the line 5 5 of Fig. 2, showing the adjustable bearing for the spiral quadrant-gear. Fig. 6 is a detail plan view showing a portion of the front axle, one of the front wheels, and the connection of the same to the steering mechanism shown in Fig. 4. Figs. 7 and 8 are respectively an under side view and a rear elevation of the casing of the steering-gear.

The improved steering mechanism has been designed with reference to its use in connection with wheels mounted to swing independently, each front wheel G' being mounted upon a stud-axle G², which in turn is mounted in the yoke D² of the front axle D to oscillate in a substantially horizontal plane and has a rearwardly-extended arm G³, the front axle being itself horizontally pivoted to have movement in a vertical plane. Each arm G³ is connected by a link or rod G⁴ to a frame G⁵, which is pivotally supported by the front axle to swing in a substantially horizontal plane about an axis substantially in the plane of movement of the axle. A link or rod P connects the frame G⁵ operatively with an arm P' by joints, such as ball-and-socket joints, which permit free movement in different directions, as represented in the drawings. The arm P' is supported in bearings carried by the floor of the vehicle-body to swing fore and aft and has formed with and secured to its hub a gear-sector P², which is disposed in a substantially vertical plane. A corresponding skew-gear sector P³ meshes with the gear-sector P² and is disposed in a substantially horizontal plane, being secured to a vertical steering-shaft P⁴, which projects upwardly through the floor of the vehicle-body to a proper height to receive the handle or other operating means P⁵, the body being, as usual, spring-supported with relation to the axle, as already shown in Fig. 1. By thus supporting both of the gear-sectors and their associate parts upon the vehicle-body it is possible to make this part of the steering mechanism both compact and simple and to keep it up out of the dust, dirt, and stones which fly in greater quantities at the level of the axle. It is necessary, however, to make provision for the relative movement which must take place between the vehicle-body and the wheels.

The head of the shaft P⁴ is squared or otherwise formed to fit in an opening of corresponding shape in the hub $p$, which may be split and provided with a clamping-screw $p'$ or simply have a sliding fit on the head of the shaft or be otherwise applied, so that the handle can be removed readily when the vehicle is left alone, and yet wear be taken up to prevent backlash between the handle and shaft. The gear-sectors are preferably spiral or skew-gear sectors, and the pitch of the teeth of the gear-sector $p^3$ is preferably about as represented, so that the liability of the wheels to be thrown to one side or the other by striking obstructions shall be resisted without transmission of shock to the steering-handle P⁵, and so that at the same time a turning of the handle in one direction or the other shall produce a corresponding turning of the wheels in the same direction, whereby the position of the handle always corresponds approximately with the direction in which the vehicle is turned. In order to provide for a proper meshing of the gear-sector $p^2$ with the gear-sector $p^3$, the said gear-sector $p^2$ is mounted adjustably in its supporting-bracket by means of an eccentric pivot $p^2$, which is capable of rotation in the arms of the bracket, which are split, the pivot being secured in adjusted position by bolts $p^3$. It will be observed that the links $G^4$ are connected to the frame $G^5$ at separated points $g^4$ on opposite sides of the central line, so that the wheels on opposite sides are swung or oscillated through different angles that they may accommodate themselves to the curves of different radii in which the vehicle is turned and that the arm $g^5$ of the frame $G^5$, to which the link P is connected, is placed substantially at right angles to the direction of said link, so that the greatest leverage is obtained on the frame. The frame $G^5$ is preferably formed, as shown clearly in Fig. 4 of the drawings, with three arms diverging from the common center, at which is the pivoted connection between the frame and the axle, two of said arms being connected, respectively, with the oscillating steering-wheels, while the third arm is extended to one side substantially in the plane of the axle and at its extremity is connected by a ball-and-socket joint or other similar joint, as indicated above, with the link P. The axis about which the frame swings is substantially in the plane of the axle, but, as represented in Fig. 2, may be slightly oblique in respect to the horizontal axis about which the axle moves.

As will be understood, the intermeshing skew-gears $P^2$ and $P^3$ constitute a back-lock which substantially prevents the transmission of motion from the wheels to the steering-handle, while it permits the desired transmission of motion from the steering-handle to the steering-wheels. Furthermore, the arrangement of the transmitting devices between the skew-gear $P^2$ and the wheels permits the freedom of movement of the connections of the steering mechanism which is necessary in order that the steering mechanism may accommodate itself to the relative movement of the front axle with respect to the running-gear and of the vehicle-body with respect to the running-gear, while at the same time it affords no opportunity for backlash, the several connections being so positive in their nature as to secure an immediate and direct response in the movement of the steering-wheels to the movement of the steering-handle.

In order that the steering mechanism may always work properly, it is desirable that the gears $P^2$ and $P^3$ be protected from dirt and mud, and we have therefore designed the casing R, (shown in detail in Figs. 2, 4, 7, and 8,) which permits the necessary movements of the parts, while preventing the penetration of mud splashed up as the vehicle is moved forward to the gears. As represented in the drawings, it may be made of leather, fiber, sheet metal, or other suitable material and comprises a vertical wall $r$, bent to conform to the general outline of the gears and their supports, and a bottom $r'$. The vertical wall $r$ is provided with lugs $r^2$, by which the casing is secured firmly and closely to the under side of the vehicle-body. The bottom $r'$ is slotted at its rear portion, as at $r^3$, and the rear of the vertical wall $r$ may also be slotted, as at $r^4$, to permit of the necessary motion of the arm P', which is the only portion of the mechanism projecting through the casing.

The mode of use of the several features of this invention and the applicability thereof to other vehicles than that shown in the accompanying drawings will be readily understood without further explanation herein. It will also be understood that this invention is not to be limited to the precise construction and arrangement of parts shown and described herein.

We claim as our invention—

1. In a vehicle, the combination with a running-gear frame, and an axle and wheels mounted to oscillate with respect to said axle, of a steering-frame supported by said running-gear frame upon a vertical axis and connected by links with said wheels, a gear supported upon a horizontal axis below the vehicle-body and having an arm to swing to and fro, a link connected at one end by a universal joint with said arm and at the other end by a universal joint with said steering-frame at a point at one side of its axis, a steering-shaft, and a gear mounted on said shaft and meshing with the first-named gear.

2. In a vehicle, the combination with a running-gear frame, and an axle and wheels mounted to oscillate with respect to said axle, of a steering-frame supported by said running-gear frame upon a vertical axis and connected by links with said wheels, a skew-gear supported upon a horizontal axis below the vehicle-body and having an arm to swing to and fro, a link connected at one end by a universal joint with said arm and at the other end by a universal joint with said steering-frame at a point at one side of its axis, a vertical steering-shaft, and a gear mounted on said shaft, and meshing with said skew-gear.

3. In a vehicle, the combination with a body, a steering-shaft supported upon said body and provided with a skew-gear, a second gear supported by said body in mesh with the first-named gear, an arm carried with said last-named gear, and a link connected with said arm, of a steering-frame having an arm at substantially right angles to the direction of the link and connected therewith with freedom of movement in different directions, an axle, wheels mounted to oscillate with respect to said axle, and links connecting the supports of said wheel with said steering-frame at separated points on opposite sides of a central line.

4. In a vehicle, the combination of a body, a steering-shaft and coöperating skew-gears mounted upon said body, a running-gear frame comprising a horizontally-pivoted axle adapted to have movement in a vertical plane, independent steering-wheels carried by said axle, a steering-frame pivoted to said axle and having the axis of its pivot substantially in the plane of movement of the axle, a fixed arm on said steering-frame, connections between said arm and one of the skew-gears permitting free movement in different directions and connections from said frame to said wheels.

5. In a vehicle, the combination of a running-gear frame comprising a horizontally-pivoted axle, wheels mounted to oscillate with respect to said axle, a steering-frame pivotally mounted upon the axle and having a plurality of arms diverging from the pivotal point, connections between two of said arms and the wheels, a vehicle-body, a steering-shaft mounted upon said vehicle-body and provided with a gear, a skew-gear supported by the body and in mesh with the gear of the steering-shaft, an arm carried with the last-named gear, and connections between said arm and the third arm of the steering-frame permitting free movement in different directions.

6. In a vehicle, the combination of a running-gear frame comprising a relatively movable axle provided with wheels pivotally mounted to oscillate with respect to the axle, a vehicle-body spring supported with relation to the axle, a steering-frame pivoted to said axle on a substantially vertical axis, a steering-shaft mounted upon the body and bearing a gear, an arm adjustably mounted with relation to said shaft, a segmental skew-gear fixed to said arm and meshing with the gear of the steering-shaft, connections between said arm and the steering-frame permitting free movement in different directions, and connections between the steering-frame and the wheels.

7. In a vehicle, the combination of a running-gear frame including an axle relatively movable in a vertical plane, wheels mounted to oscillate with respect to said axle, a series of arms diverging from a common center, said central point forming a pivotal connection between the arms and axle, a vehicle-body spring supported with relation to the axle, a steering-shaft supported upon the body and provided with a gear, a skew-gear meshing with the gear of the steering-shaft adjustably toward and away from said gear and having a dependent arm, connections between said arm and one of the diverging arms permitting free movement in different directions, and connections between the other arms and the wheels.

8. In a vehicle, the combination of a running-gear frame including an axle relatively movable in a vertical plane, wheels mounted to oscillate with respect to said axle, a series of arms diverging from a common center, said central point forming a pivotal connection between the arms and axle, the pivot being located below the axle substantially in the plane of the axle, a vehicle-body, a steering-shaft supported upon said body and provided with a gear, a skew-gear meshing with the gear of the steering-shaft mounted upon an adjustable pivot and having a dependent arm, connections between said arm and one of the diverging arms permitting free movement in different directions, and connections between the arms and the wheels.

9. In a vehicle, the combination of a running-frame including an axle relatively movable in a vertical plane, wheels mounted to oscillate with respect to said axle, a vehicle-body spring supported upon the running-frame, a steering-frame comprising a series of divergent arms, the frame as a whole pivoted to the axle of the running-gear frame and having its axis obliquely disposed to the axis of the axle-pivot, a pair of skew-gears mounted upon the body and adjustable with relation to each other, a steering-shaft secured to one of said gears, an arm dependent from the second of said gears, connections between the arm and the steering-frame, and connections between the steering-frame and the wheels.

10. In a vehicle, the combination of a running-gear frame including an axle member pivoted for vertical oscillation and bearing-wheels mounted to oscillate with respect to said axle, a pivoted steering-frame adapted to oscillate in a substantially horizontal plane, and having its axis substantially in the plane of movement of the axle, a steering-shaft, a gear secured thereto, a skew-gear in mesh with the gear of the steering-shaft and mounted upon a rotarily-adjustable pivot, connections between the last-named gear and the steering-frame permitting free movement in different directions, and connections between the steering-frame and the wheels whereby relative movement is permitted between the steering-shaft and the steering-frame and between the axle and the wheels.

11. In a vehicle, the combination of a spring-supported body, a steering-shaft and back-lock transmitting mechanism mounted upon said body, a running-gear frame, an axle relatively movable in a vertical plane, wheels pivotally mounted to oscillate with respect to the axle, a steering-frame pivotally mounted on the axle, positive link connections between said frame and said wheels, and positive, but flexible, link connections between said frame and said transmitting mechanism on the body.

12. In a vehicle, the combination of a spring-supported body, a steering-shaft and back-lock transmitting mechanism mounted upon said body, a running-gear frame, an axle relatively movable in a vertical plane, wheels pivotally mounted to oscillate with respect to the axle and positive, but flexible, connections between said back-lock transmitting mechanism and said wheels.

13. In a vehicle, the combination of a spring-supported body, a steering-shaft and back-lock transmitting mechanism mounted upon said body, a running-gear frame, wheels pivotally mounted to oscillate with respect to said frame, and positive, but flexible, connections between said back-lock transmitting mechanism and said wheels.

14. In a vehicle, the combination of a spring-supported body, a steering-shaft and back-lock transmitting mechanism mounted upon said body, an axle relatively movable in a vertical plane, wheels pivotally mounted to oscillate with respect to the axle, and operative link connections between said back-lock transmitting mechanism and said wheels having joints capable of movement in different directions whereby positive action is secured with flexibility to accommodate the relative movements of the body and axle.

15. In a vehicle, the combination of a spring-supported body, a steering-shaft and back-lock transmitting mechanism mounted upon said body, an axle relatively movable in a vertical plane, wheels pivotally mounted to oscillate with respect to the axle, a vertical arm secured to said back-lock transmitting mechanism and connections between said arm and said wheels including links and levers connected by joints capable of movement in different directions whereby positive action is secured with flexibility to accommodate the relative movements of the body and axle.

16. In a vehicle, the combination of an axle, a body-spring supported with reference to the axle, a steering-shaft having a skew-gear at its lower end, bearings for said shaft mounted on said body, a gear-sector also mounted on the body in mesh with said skew-gear, a substantially vertical arm connected with said gear-sector, a substantially horizontal link connected to said arm, a second arm connected to said link and substantially at right angles therewith, stud-axles pivoted on said axle, and operative connections from said last-named arm to said stud-axles.

17. In a vehicle, the combination of an axle, a body-spring supported with reference to the axle, a steering-shaft having a skew-gear at its lower end, bearings for said shaft mounted on said body, a gear-sector also mounted on the body in mesh with said skew-gear, a substantially vertical arm connected with said gear-sector, a substantially horizontal link connected to said arm by a joint having freedom for movement in different directions, a second arm also connected to said link by a joint having freedom of movement in different directions and substantially at right angles with said link, stud-axles pivoted on said axle and operative connections between said second arm and said stud-axles whereby said stud-axles are moved together but through different angles.

This specification signed and witnessed this 15th day of May, A. D. 1897.

HIRAM PERCY MAXIM.
HARRY M. POPE.

In presence of—
ALBERT P. DAY,
HERMANN F. CUNTZ.